(12) United States Patent
Hung et al.

(10) Patent No.: US 11,227,135 B2
(45) Date of Patent: Jan. 18, 2022

(54) OPTICAL FINGERPRINT SENSING APPARATUS

(71) Applicant: Egis Technology Inc., Hsinchu (TW)

(72) Inventors: Ching-Ho Hung, Hsinchu County (TW); Sheng-Ruei Hsu, Hsinchu County (TW); Tzu-Yang Peng, Hsinchu County (TW); Chi-Fang Hsieh, Hsinchu County (TW)

(73) Assignee: Egis Technology Inc., Hsinchu (TW)

( * ) Notice: Subject to any disclaimer, the term of this patent is extended or adjusted under 35 U.S.C. 154(b) by 60 days.

(21) Appl. No.: 16/835,323

(22) Filed: Mar. 31, 2020

(65) Prior Publication Data

US 2020/0334435 A1 Oct. 22, 2020

Related U.S. Application Data

(60) Provisional application No. 62/836,091, filed on Apr. 19, 2019.

(30) Foreign Application Priority Data

Feb. 27, 2020 (CN) .......................... 202010124239.5

(51) Int. Cl.
*G06K 9/00* (2006.01)
*G06K 9/40* (2006.01)

(52) U.S. Cl.
CPC ............. *G06K 9/0002* (2013.01); *G06K 9/40* (2013.01); *G06K 9/00087* (2013.01)

(58) Field of Classification Search
CPC .... G06K 9/0002; G06K 9/40; G06K 9/00087; G06K 9/0004
See application file for complete search history.

(56) References Cited

U.S. PATENT DOCUMENTS

| 10,068,121 B2 | 9/2018 | Kremin et al. | |
|---|---|---|---|
| 2006/0114342 A1* | 6/2006 | Egawa | H04N 5/361 348/241 |
| 2009/0060337 A1* | 3/2009 | Novikov | G06K 9/40 382/181 |
| 2010/0091160 A1* | 4/2010 | Murakami | H04N 5/378 348/301 |
| 2011/0018850 A1* | 1/2011 | Uehata | G06F 3/0412 345/207 |
| 2012/0119070 A1* | 5/2012 | Ryoki | H04N 5/378 250/208.1 |

(Continued)

FOREIGN PATENT DOCUMENTS

| CN | 104951152 | 9/2015 |
|---|---|---|
| TW | I463383 | 12/2014 |

*Primary Examiner* — Edward F Urban
*Assistant Examiner* — Wassim Mahrouka
(74) *Attorney, Agent, or Firm* — JCIPRNET

(57) ABSTRACT

An optical fingerprint sensing apparatus is provided. A control circuit controls a first selection circuit to output at least one of fingerprint sensing signals on sensing signal lines, and controls a second selection circuit to output at least one of background noise signals on dummy sensing signal lines, so that the first selection circuit and the second selection circuit simultaneously output the fingerprint sensing signal and the background noise signal, respectively. The signal processing circuit cancels background noise of the fingerprint sensing signals according to the background noise signal.

4 Claims, 8 Drawing Sheets

(56) References Cited

U.S. PATENT DOCUMENTS

| | | | |
|---|---|---|---|
| 2012/0235021 A1* | 9/2012 | Kasai | H04N 5/3559 |
| | | | 250/208.1 |
| 2015/0116533 A1* | 4/2015 | Hsu | H04N 5/361 |
| | | | 348/223.1 |
| 2015/0162925 A1* | 6/2015 | Lee | H03M 1/1295 |
| | | | 250/208.1 |
| 2016/0227142 A1* | 8/2016 | Lin | G06K 9/00013 |
| 2016/0315112 A1* | 10/2016 | Park | H04N 5/361 |
| 2018/0101715 A1* | 4/2018 | Lee | G06K 9/00013 |
| 2019/0373195 A1* | 12/2019 | Minagawa | H04N 5/374 |

* cited by examiner

OPTICAL FINGERPRINT SENSING APPARATUS

CROSS-REFERENCE TO RELATED APPLICATION

This application claims the priority benefits of U.S. provisional application No. 62/836,091, filed on Apr. 19, 2019 and China application no. 202010124239.5, filed on Feb. 27, 2020. The entirety of each of the above-mentioned patent applications is hereby incorporated by reference herein and made a part of this specification.

TECHNICAL FIELD

The invention relates to a fingerprint sensing apparatus, and more particularly, to an optical fingerprint sensing apparatus.

BACKGROUND

Fingerprints are the best biometric passwords and are unique. With the maturity and popularity of equipment and identification technology, in addition to home access control, personal identification, identity authentication in payment systems or places that require a high degree of access control, fingerprint sensing apparatus are also commonly used as an identification application in mobile devices in recent years.

In a large-area fingerprint sensor, since the fingerprint sensing area is large, more time is required for fingerprint recognition. In addition, the large-area fingerprint sensor also makes sensing signal lines more susceptible to environmental noise, which reduces the accuracy of fingerprint interpretation and affects the quality of fingerprint sensing.

SUMMARY

The invention provides an optical fingerprint sensing apparatus that can effectively cancel noise of fingerprint sensing signals to improve fingerprint sensing quality.

The optical fingerprint sensing apparatus of the invention includes an optical sensing panel, a selection circuit, a selection circuit, a control circuit and a signal processing circuit. The optical sensing panel has a sensing area and a dummy sensing area. The sensing area includes a plurality of light sensing units. The light sensing units are configured to receive a reflected light from a finger to generate a plurality of fingerprint sensing signals. The first selection circuit is coupled to a plurality of sensing signal lines corresponding to the sensing area. The second selection circuit is coupled to a plurality of dummy sensing signal lines corresponding to the dummy sensing area. The control circuit is coupled to the optical sensing panel, the first selection circuit and the second selection circuit, controls a first selection circuit to output at least one of fingerprint sensing signals of sensing signal lines, and controls the second selection circuit to output at least one signal of the dummy sensing signal lines as a background noise signal, so that the first selection circuit and the second selection circuit simultaneously output the fingerprint sensing signal and the background noise signal, respectively. The signal processing circuit is coupled to the first selection circuit and the second selection circuit, and cancels background noise of the background noise signals according to the background noise signal.

Based on the above, according to the embodiments of the invention, the control circuit controls the first selection circuit and the second selection circuit to simultaneously output the fingerprint sensing signal and the background noise signal, respectively, so that the signal selection circuit cancels background noise of the fingerprint sensing signals according to the background noise signal. Accordingly, noise of the fingerprint sensing signals can be effectively cancelled to improve fingerprint sensing quality.

To make the aforementioned more comprehensible, several embodiments accompanied with drawings are described in detail as follows.

DETAILED DESCRIPTION

Figure 1:
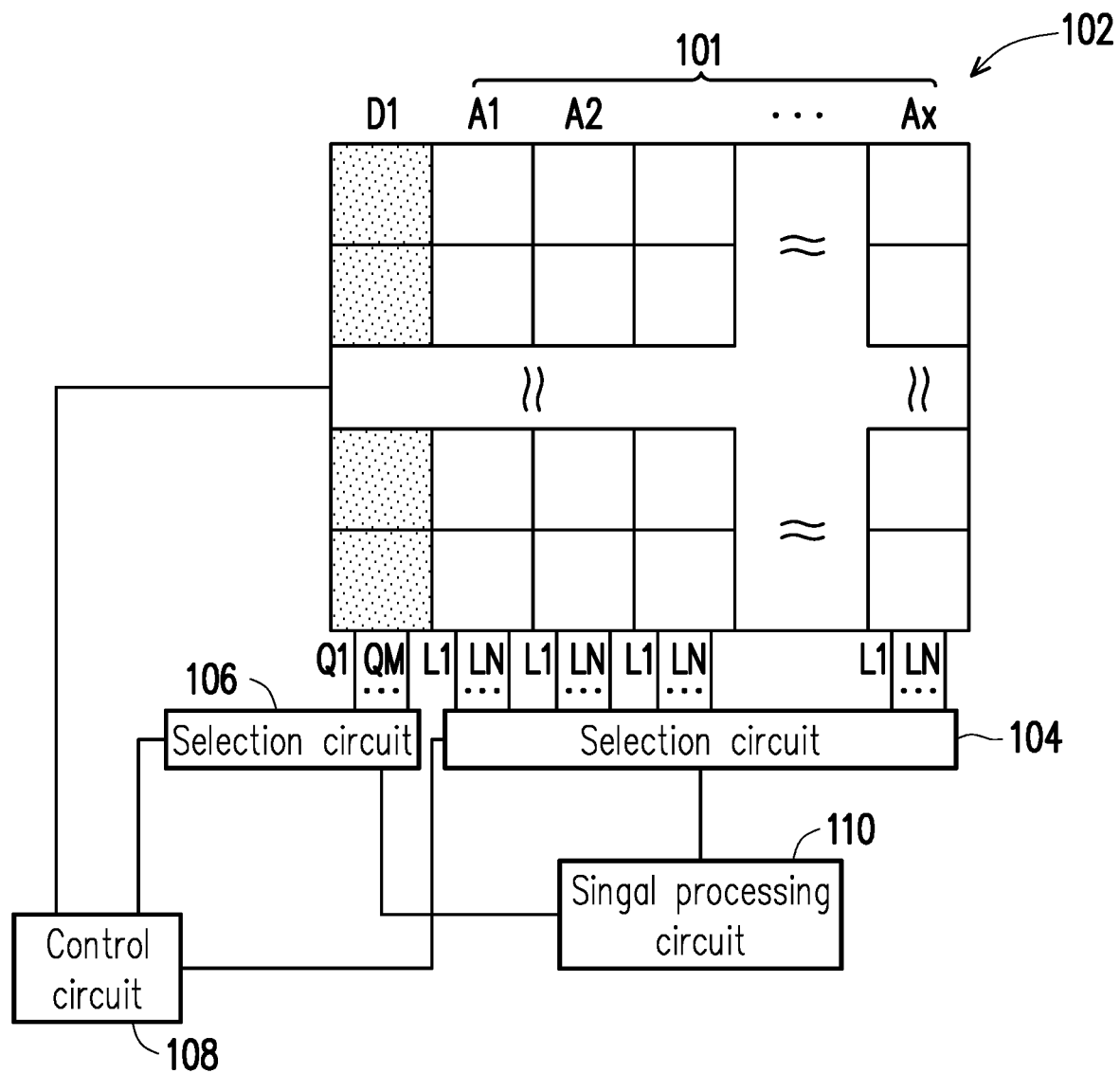
FIG. 1 is a schematic diagram of an optical fingerprint sensing apparatus according to an embodiment of the invention.

FIG. 1 is a schematic diagram of an optical fingerprint sensing apparatus according to an embodiment of the invention. Referring to FIG. 1, the optical fingerprint sensing apparatus includes an optical sensing panel 102, a selection circuit 104, a selection circuit 106, a control circuit 108 and a signal processing circuit 110. Among them, the control circuit 108 is coupled to the optical sensing panel 102, the selection circuit 104 and the selection circuit 106, and the signal processing circuit 110 is coupled to the selection circuit 104 and the selection circuit 106.

The optical sensing panel 102 may include a sensing area 101 composed of a plurality of sensing columns A1 to Ax and a dummy sensing area D1. Here, X is a positive integer. Each of the sensing columns A1 to Ax may include a plurality of sensing blocks. Each of the sensing blocks may include a plurality of light sensing units. The light sensing units may receive a reflected light from a finger of a user to generate a plurality of fingerprint sensing signals for the corresponding sensing signal lines. The dummy sensing area D1 may be, for example, disposed on one side of the sensing area 101, as shown in FIG. 1. The dummy sensing area D1 may include a plurality of dummy sensing blocks. Each of the dummy sensing blocks may include a plurality of dummy sensing units. The dummy sensing unit may be implemented in the same manner as the light sensing unit. Nonetheless, the dummy sensing unit may be covered with a shielding layer for blocking light, so that signals outputted by the dummy sensing unit to corresponding dummy sensing signal lines only include a background noise signal component.

The selection circuit 104 is coupled to a plurality of sensing lines L1 to LN corresponding to each of the sensing columns A1 to Ax, and the selection circuit 106 is coupled to dummy sensing signal lines Q1 to QM corresponding to the dummy sensing area D1. Here, N and M are integers greater than or equal to 1. The control circuit 108 may control the selection circuit 104 to output at least one of the fingerprint sensing signals of the sensing signal lines L1 to LN, and control the selection circuit 106 to output at least one of a plurality of background noise signals of the dummy sensing signal lines Q1 to QM, so that the selection circuit 104 and the selection circuit 106 simultaneously output the fingerprint sensing signal and the background noise signal, respectively.

The signal processing circuit 110 may cancel background noise of the fingerprint sensing signals according to the background noise signal. More specifically, since the fingerprint sensing signal may include a signal component of fingerprint information of the user and the background noise signal component and the background noise signal and the fingerprint sensing signal are signals simultaneously generated, i.e., the background noise signal and the fingerprint sensing signal have the same component of background noise, the signal processing circuit 110 may, for example, cancel background noise of the fingerprint sensing signals by performing subtraction on the fingerprint sensing signal and the background noise signal, so as to improve the quality of fingerprint sensing.

In addition, because the control circuit 108 may control the selection circuit 104 and the selection circuit 106 to output the fingerprint sensing signal corresponding to a part of the sensing signal lines and the background noise signal corresponding to a part of the dummy sensing signal lines, the control circuit 108 may perform background noise cancellation and fingerprint information interpretation of the fingerprint sensing signal only on the fingerprint sensing signals and the background noise signals corresponding to a part of the sensing blocks and a part of the dummy sensing blocks. For example, background noise cancellation and fingerprint information interpretation of the fingerprint sensing signal may be performed only on the fingerprint sensing signals and the background noise signals of the sensing blocks and the dummy sensing blocks corresponding to an area on which the finger of the user is pressed instead of sensing and interpreting the fingerprint sensing signals and the background noise signals for each of the sensing blocks and the dummy sensing blocks. In this way, the time required for fingerprint sensing can be effectively reduced. When the optical sensing panel 102 is a large-area sensing panel, sensing efficiency of the optical fingerprint sensing apparatus can be significantly improved.

For example, when pressing positions of the finger of the user include the sensing blocks located on the sixth to seventh rows of the fifth column, the control circuit 108 may simply control the selection circuit 104 and the selection circuit 106 to output the fingerprint sensing signals provided by the sensing blocks and the background noise signals provided by the dummy sensing blocks on the sixth to seventh rows of the fifth column, so that the signal processing circuit 110 may perform background noise cancellation and fingerprint information interpretation of the fingerprint sensing signal on the fingerprint sensing signals and the background noise signals provided by the selection circuit 104 and the selection circuit 106.

In certain embodiments, the control circuit 108 may also control the optical sensing panel 102 to enable a part of the sensing area 101 and a part of the dummy sensing area D1 to generate the corresponding fingerprint sensing signal and the corresponding background noise signal. For example, by enabling only the sensing area and the dummy sensing area corresponding to an area where the finger of the user presses, power dissipation of the optical fingerprint sensing apparatus may be reduced.

Figure 2:
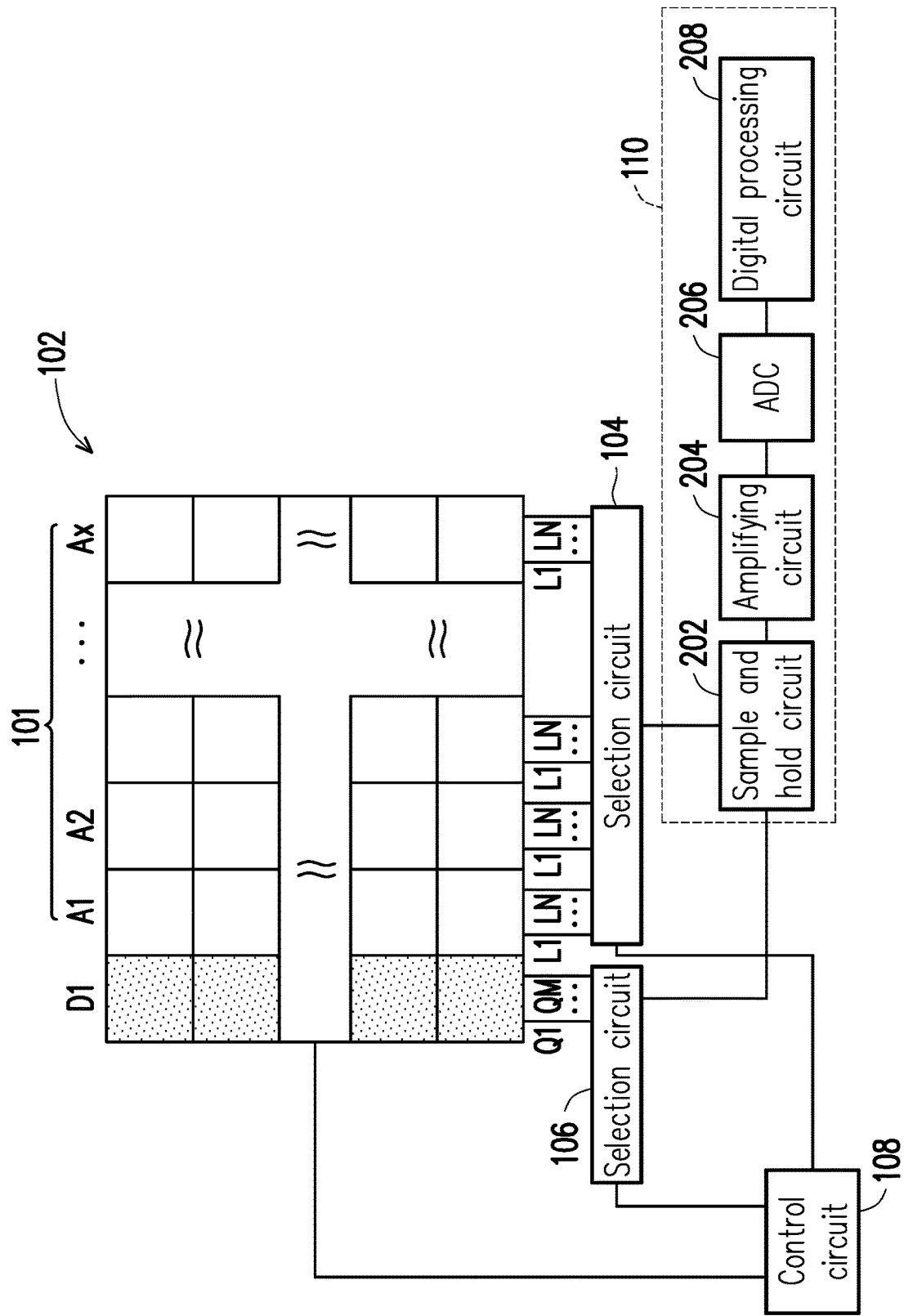
FIG. 2 is a schematic diagram of an optical fingerprint sensing apparatus according to another embodiment of the invention.

FIG. 2 is a schematic diagram of an optical fingerprint sensing apparatus according to another embodiment of the invention. In this embodiment, the signal processing circuit 110 may include a sample and hold circuit 202, an amplifying circuit 204, an analog-to-digital conversion circuit 206 and a digital processing circuit 208. Among them, the sample and hold circuit 202 is coupled to the selection circuit 104, the selection circuit 106 and the amplifying circuit 204, and the analog-to-digital conversion circuit 206 is coupled to the amplifying circuit 204 and the digital processing circuit 208. The sample and hold circuit 202 may sample and hold the fingerprint sensing signal outputted by the selection circuit 104 and the background noise signal outputted by the selection circuit 106 to generate a sensing sample signal and a noise sample signal, and cancel background noise of the sensing sample signal according to the noise sample signal so as to generate a denoised signal. For example, subtraction is performed on the sensing sample signal and the noise sample signal to cancel background noise of the sensing sample signal, so as to generate the denoised signal. The amplifying circuit 204 may amplify the denoised signal to generate an amplified analog signal. The analog-to-digital conversion circuit 206 may convert the amplified analog signal into a digital signal. The digital processing circuit 208 may determine fingerprint information of the finger according to the digital signal obtained by converting the amplified analog signal.

In this embodiment, background noise is cancelled by the sample and hold circuit 202, but no limited thereto. In certain embodiments, background noise may also be cancelled by the amplifying circuit 204 or the digital processing circuit 208. For example, if background noise is to be cancelled by the amplifying circuit 204, the amplifying circuit 204 amplifies the sensing sample signal and the noise sample signal to output a first amplified analog signal and a second amplified analog signal, respectively, and cancels background noise of the first amplified analog signal according to the second amplified analog signal to generate a denoised signal. For example, subtraction is performed on the first amplified analog signal and the second amplified analog signal to cancel background noise of the first amplified analog signal, so as to generate the denoised signal. The analog-to-digital conversion circuit 206 converts the denoised signal into a digital signal. The digital processing circuit 208 may determine fingerprint information of the finger according to the digital signal obtained by converting the denoised signal.

As another example, if background noise is to be cancelled by the digital processing circuit 208, neither the sample-and-hold circuit 202 nor the amplifying circuit 204 will perform background noise cancellation. Instead, the analog-to-digital conversion circuit 206 converts the first amplified analog signal and the second amplified analog signal into a first digital signal and a second digital signal, respectively. The digital processing circuit 208 cancels background noise of the first digital signal according to the second digital signal. For example, subtraction is performed on the first digital signal and the second digital signal to cancel background noise of the first digital signal, and fingerprint information of the finger is determined according to the first digital signal in which background noise is cancelled.

Figure 3:
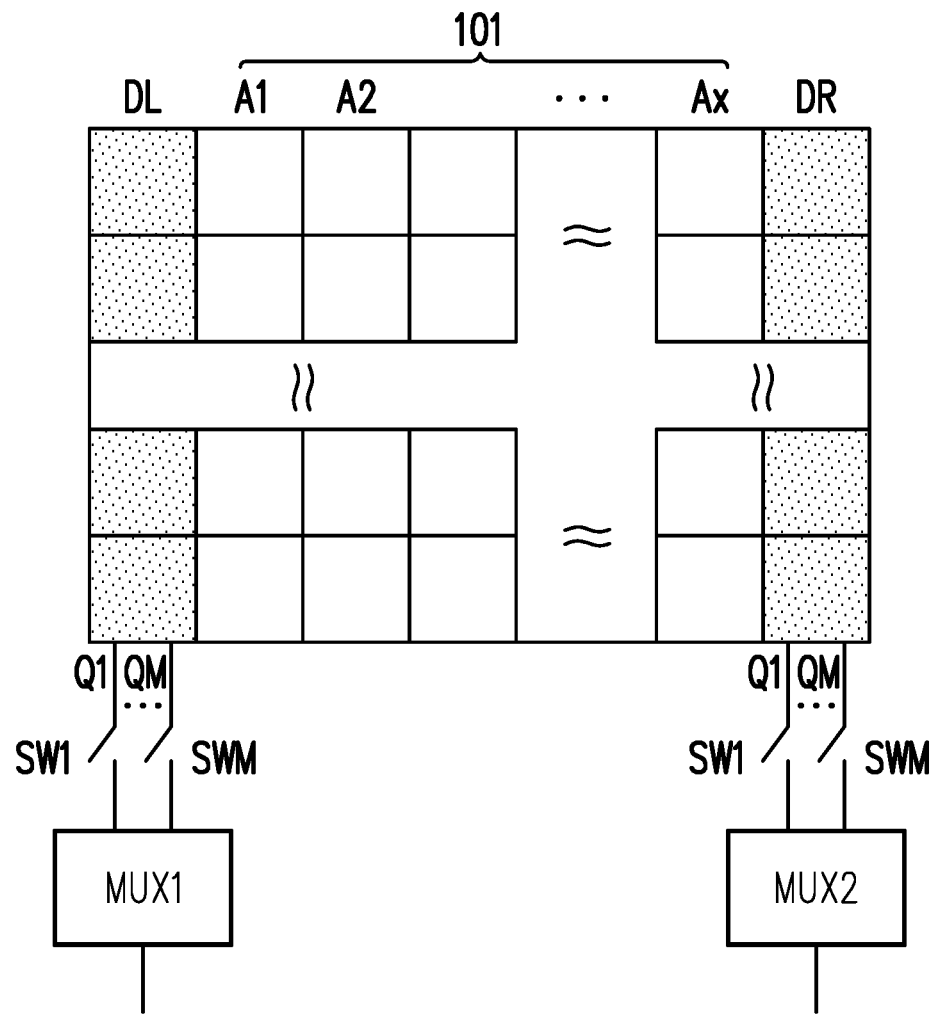
FIG. 3 is a schematic diagram of a selection circuit selecting and outputting a background noise signal according to an embodiment of the invention.

In the foregoing embodiment, the dummy sensing area D1 is disposed on one side of the optical sensing panel 102, but not limited thereto in other embodiments. For example, as shown in FIG. 3, the optical sensing panel 102 may also include dummy sensing areas DL and DR disposed on opposite sides of the sensing area 101. In addition, the selection circuit 106 may be implemented with a plurality of switches. For example, as shown in FIG. 3, the dummy sensing areas DL and DR may be correspondingly coupled to a plurality of switches SW1 to SWM, respectively. The control circuit 108 may control on-states of the switches SW1 to SWM corresponding to the dummy sensing areas DL and DR to determine whether the background noise signals are to be provided by the dummy sensing signal lines corresponding to the dummy sensing areas DL or DR. For example, the switches SW1 to SWM corresponding to the dummy sensing area DL may be simultaneously turned on, and the switches SW1 to SWM corresponding to the dummy sensing area DR may be simultaneously turned off. Alternatively, the switches SW1 to SWM corresponding to the dummy sensing area DL may be simultaneously turned off, and the switches SW1 to SWM corresponding to the dummy sensing area DR may be simultaneously turned on. In addition, the optical fingerprint sensing apparatus may further include multiplexers MUX1 and MUX2. The multiplexers MUX1 and MUX2 are coupled to the switches SW1 to SWM corresponding to the dummy sensing area DL and the switches SW1 to SWM corresponding to the dummy sensing area DR, respectively. The multiplexers MUX1 and MUX2 may be controlled by the control circuit 108 to respectively output, to the sample and hold circuit 202, one of the background noise signals provided by the switches SW1 to SWM, respectively.

Figure 4:
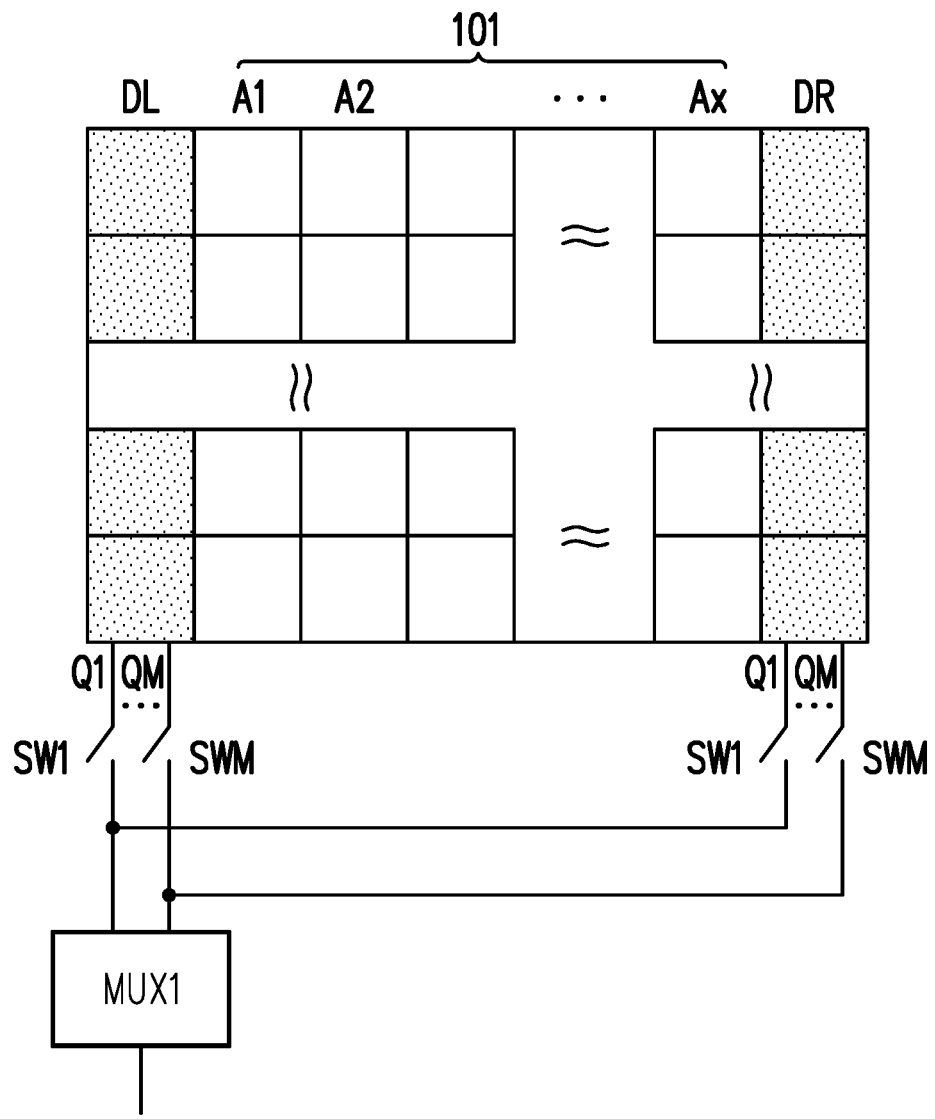
FIG. 4 is a schematic diagram of a selection circuit selecting and outputting a background noise signal according to another embodiment of the invention.

In certain embodiments, the optical fingerprint sensing apparatus may only include the multiplexer MUX1. As shown in FIG. 4, the multiplexer MUX1 is coupled to both the switches SW1 to SWM corresponding to the dummy sensing area DL and switches SW1' to SWM' corresponding to the dummy sensing area DR. Similarly, the multiplexer MUX1 may be controlled by the control circuit 108 to output, to the sample and hold circuit 202, one of the background noise signals provided by the switches SW1 to SWM corresponding to the dummy sensing area DL and the switches SW1' to SWM' corresponding to the dummy sensing area DR, respectively. The multiplexer MUX1 in this embodiment may be integrated in the signal processing circuit 110 and controlled by the signal processing circuit 110 to select and output signals.

Figure 5:
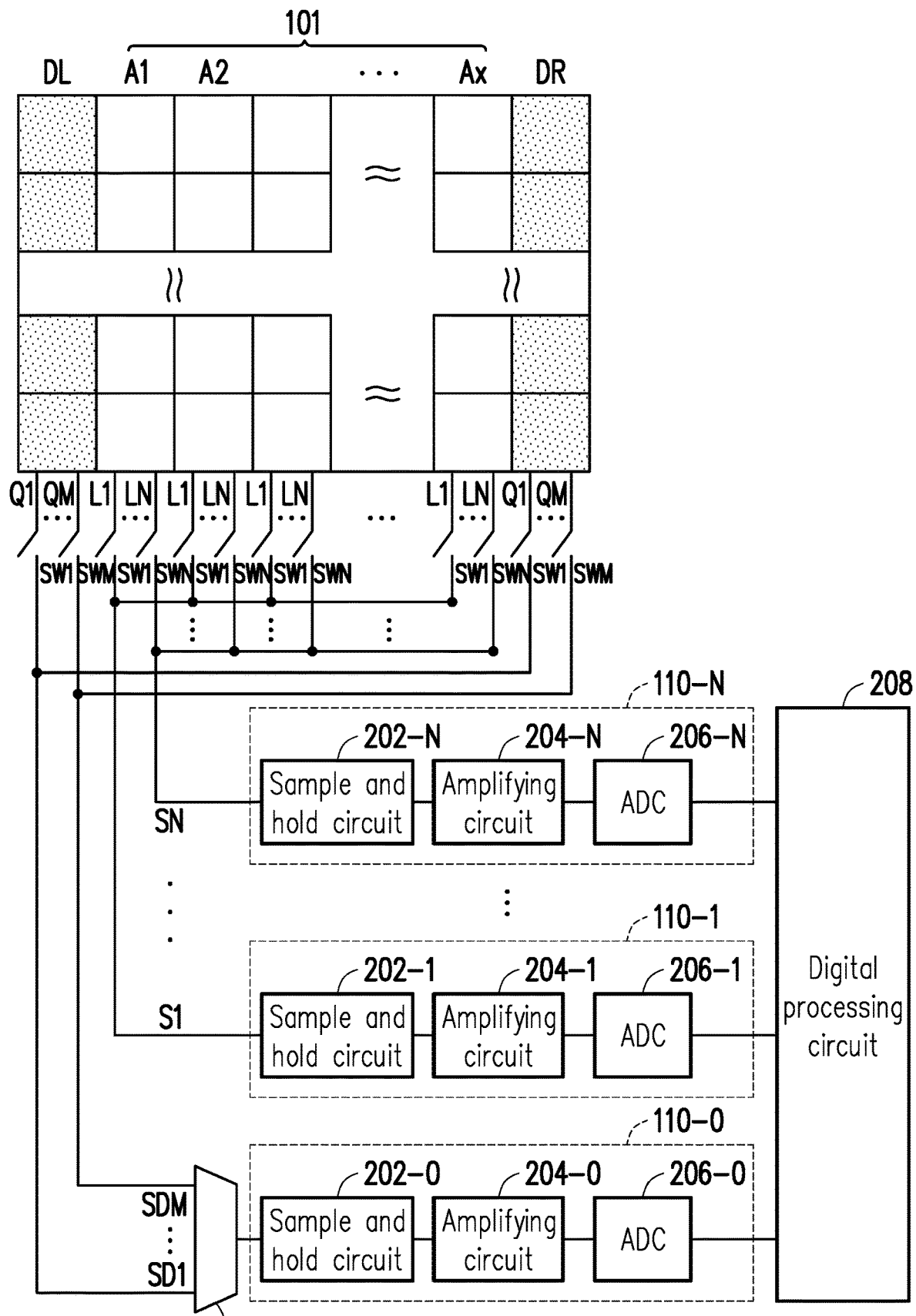
FIG. 5 is a schematic diagram of an optical fingerprint sensing apparatus according to another embodiment of the invention.

FIG. 5 is a schematic diagram of an optical fingerprint sensing apparatus according to another embodiment of the invention. In this embodiment, the selection circuit 104 is implemented with a plurality of switches. Here, the sensing signal lines L1 to LN of each of the sensing columns A1 to Ax are coupled to the corresponding switches SW1 to SWM. The dummy sensing signal lines Q1 to QN of the dummy sensing areas DL and DR are coupled to the corresponding switches SW1 to SWM. Here, on-states of the corresponding switches SW1 to SWM of each of the sensing columns A1 to Ax and the corresponding switches SW1 to SWM of the dummy sensing areas DL and DR are controlled by the control circuit 108 (to keep the drawing concise, the control circuit 108 is not labeled in FIG. 5).

In addition, the signal processing circuit 110 may include a plurality of signal conversion circuits 110-0 to 110-N, the digital processing circuit 208 and the multiplexer MUX1 in this embodiment. Here, the signal conversion circuit 110-1 may be coupled to the corresponding sensing signal line L1 through the corresponding switch SW1 of each of the sensing columns A1 to Ax; the signal conversion circuit 110-2 may be coupled to the corresponding sensing signal line L2 through the corresponding switch SW2 of each of the sensing columns A1 to Ax, and so on and so forth; the signal conversion circuit 110-N may be coupled to the corresponding sensing signal line LN through the corresponding switch SWN of each of the sensing columns A1 to Ax. In addition, an input terminal of the multiplexer MUX1 may be coupled to the corresponding dummy sensing signal lines Q1 to QM through the corresponding switches SW1 to SWM of the dummy sensing areas DL and DR.

Each of the signal conversion circuits 110-0 to 110-N may include corresponding sample and hold circuits 202-0 to 202-N, amplifying circuits 204-0 to 204-N and analog-to-digital conversion circuits 206-0 to 206-N. Among them, the sample and hold circuit 202-0 is coupled to an output terminal of the multiplexer MUX1 and the amplifying circuit 204-0, and the analog-to-digital conversion circuit 206-0 is coupled to the amplifying circuit 204-0 and the digital processing circuit 208. A coupling manner of the sample and hold circuits 202-1 to 202-N, the amplifying circuits 204-1 to 204-N and the analog-to-digital conversion circuits 206-1 to 206-N is similar to a coupling manner of the sample and hold circuit 202-0, the amplifying circuit 204-0 and the analog-to-digital conversion circuit 206-0, but differs in that the sample and hold circuit 202-1 is coupled to the corresponding switch SW1 of each of the sensing columns A1 to Ax; the sample and hold circuit 202-2 is coupled to the corresponding switch SW2 of each of the sensing columns A1 to Ax, and so on and so forth; the sample and hold circuit 202-N is coupled to the corresponding switch SWN of each of the sensing columns A1 to Ax.

The control circuit 108 can control on-states of the corresponding switches SW1 to SWN of each of the sensing columns A1 to Ax and on-states of the corresponding switches SW1 to SWM of each of the dummy sensing areas DL and DR, so as to transmit the fingerprint sensing signals and the background noise signals to the corresponding sample and hold circuits and the multiplexer MUX1, respectively. For instance, the control circuit 108 may control the switch SW1 corresponding to one of the sensing columns A1 to Ax to enter on-state, and simultaneously control the switches SW1 to SWM corresponding to one of the dummy sensing areas DL and DR to enter on-state, so that the sensing signal line L1 corresponding to the sensing column selected by the control circuit 108 may provide a fingerprint sensing signal S1 to the sample and hold circuit 202-1 through the switch SW1. Meanwhile, the control circuit 108 may control the multiplexer to select a background noise signal SD1 provided by one of the dummy sensing areas DL and DR for the sample and hold circuits 202-0.

After going through a series of signal processes performed by circuits including the sample and hold circuit 202-1, the amplifying circuit 204-1 and the analog-to-digital conversion circuit 206-1, the fingerprint sensing signal S1 is turned into the first digital signal to be output to the digital processing circuit 208. Similarly, after going through a series of signal processes performed by circuits including the sample and hold circuit 202-0, the amplifying circuit 204-0 and the analog-to-digital conversion circuit 206-0, the background noise signal SD1 is turned into the second digital signal to be output to the digital processing circuit 208. Here, an implementation of the sample and hold circuits 202-0 and 202-1, the amplifying circuits 204-0 and 204-1 and the analog-to-digital conversion circuits 206-0 and 206-1 is similar to an implementation of the sample and hold circuit 202, the amplifying circuit 204 and the analog-to-digital conversion circuit 206 for canceling background noise in the foregoing embodiment, which is not repeated hereinafter. The digital processing circuit 208 may cancel background noise of the first digital signal according to the second digital signal. For example, subtraction is performed on the first digital signal and the second digital signal to cancel background noise of the first digital signal, and fingerprint information of the finger is determined according to the first digital signal in which background noise is cancelled. By analogy, for the rest of the fingerprint sensing signals S2 to SN, background noise may also be cancelled by using one of the background noise signals SD2 to SDM in a similar manner, and the implementation regarding the same is not repeated hereinafter.

Figure 6:
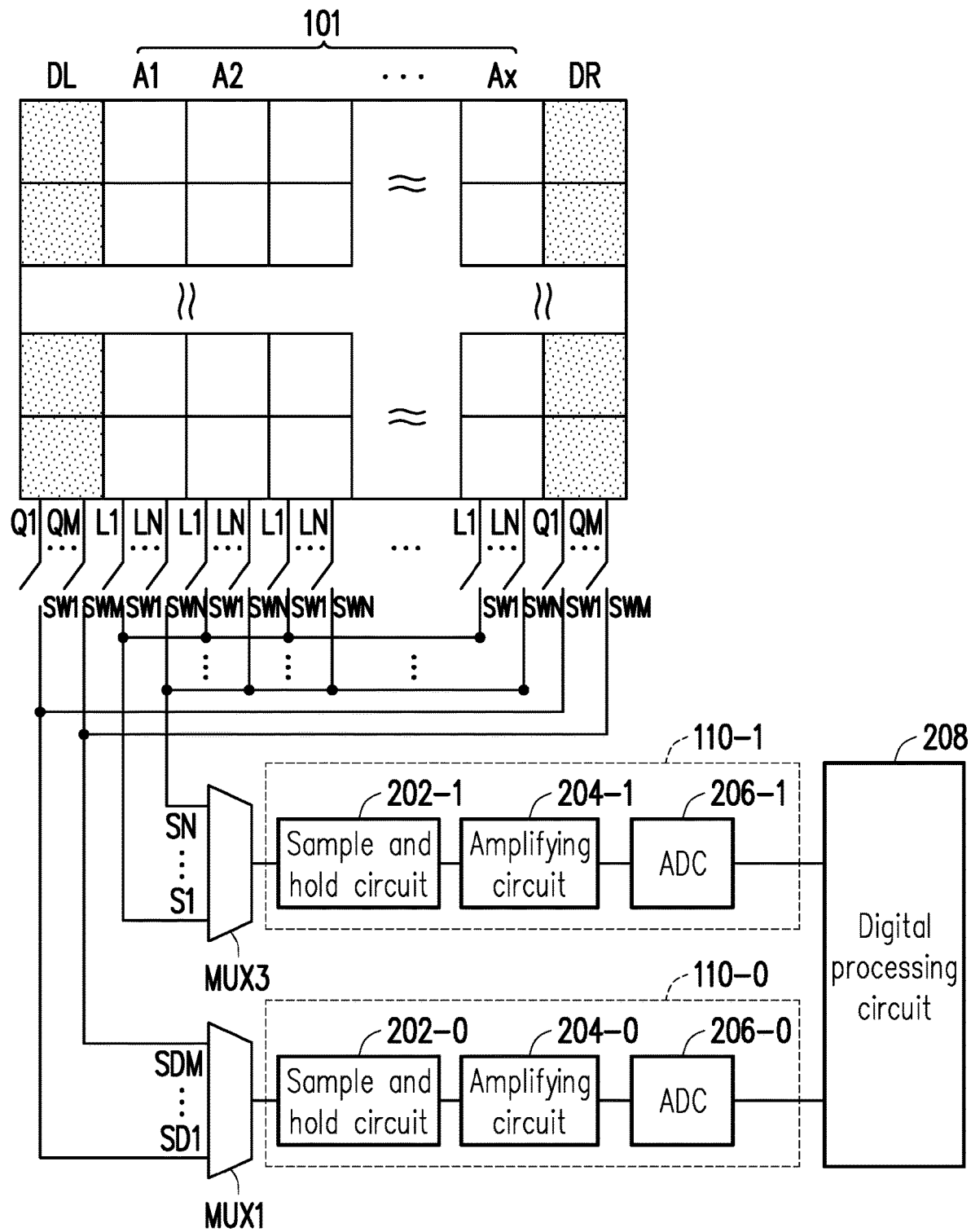
FIG. 6 is a schematic diagram of an optical fingerprint sensing apparatus according to another embodiment of the invention.

FIG. 6 is a schematic diagram of an optical fingerprint sensing apparatus according to another embodiment of the invention. The optical fingerprint sensing apparatus of the present embodiment differs from the optical fingerprint sensing apparatus in the embodiment of FIG. 5 in that, the signal processing circuit 110 of the present embodiment may include a multiplexer MUX3. An input terminal of the multiplexer MUX3 may be coupled to the corresponding sensing signal lines L1 to LN through the corresponding switches SW1 to SWN of each of the sensing columns A1 to Ax, and an output terminal of the multiplexer MUX3 may be coupled to the sample and hold circuit 202-1. The control circuit 108 may control the corresponding switches SW1 to SWN of one of the sensing columns A1 to Ax to enter on-state to provide the fingerprint sensing signals S1 to SN to the multiplexer MUX3, and control the multiplexer MUX3 to output one of the fingerprint sensing signals S1 to SN to the sample and hold circuit 202-1. After going through a series of signal processes performed by circuits including the sample and hold circuit 202-1, the amplifying circuit 204-1 and the analog-to-digital conversion circuit 206-1, the fingerprint sensing signal outputted by the multiplexer MUX3 is turned into the first digital signal to be output to the digital processing circuit 208. The digital processing circuit 208 may cancel background noise of the first digital signal according to the second digital signal outputted by the analog-to-digital conversion circuit 206-0. For example, subtraction is performed on the first digital signal and the second digital signal to cancel background noise of the first digital signal, and fingerprint information of the finger is determined according to the first digital signal in which background noise is cancelled. In this way, by selecting and outputting the fingerprint sensing signals S1 to SN through the multiplexer MUX3, the signal conversion circuits required to implement the optical fingerprint sensing apparatus may be reduced down to two. As a result, the functions of the optical fingerprint sensing apparatus in the embodiment of FIG. 5 can be realized while reducing the circuit complexity and the circuit area.

Figure 7:
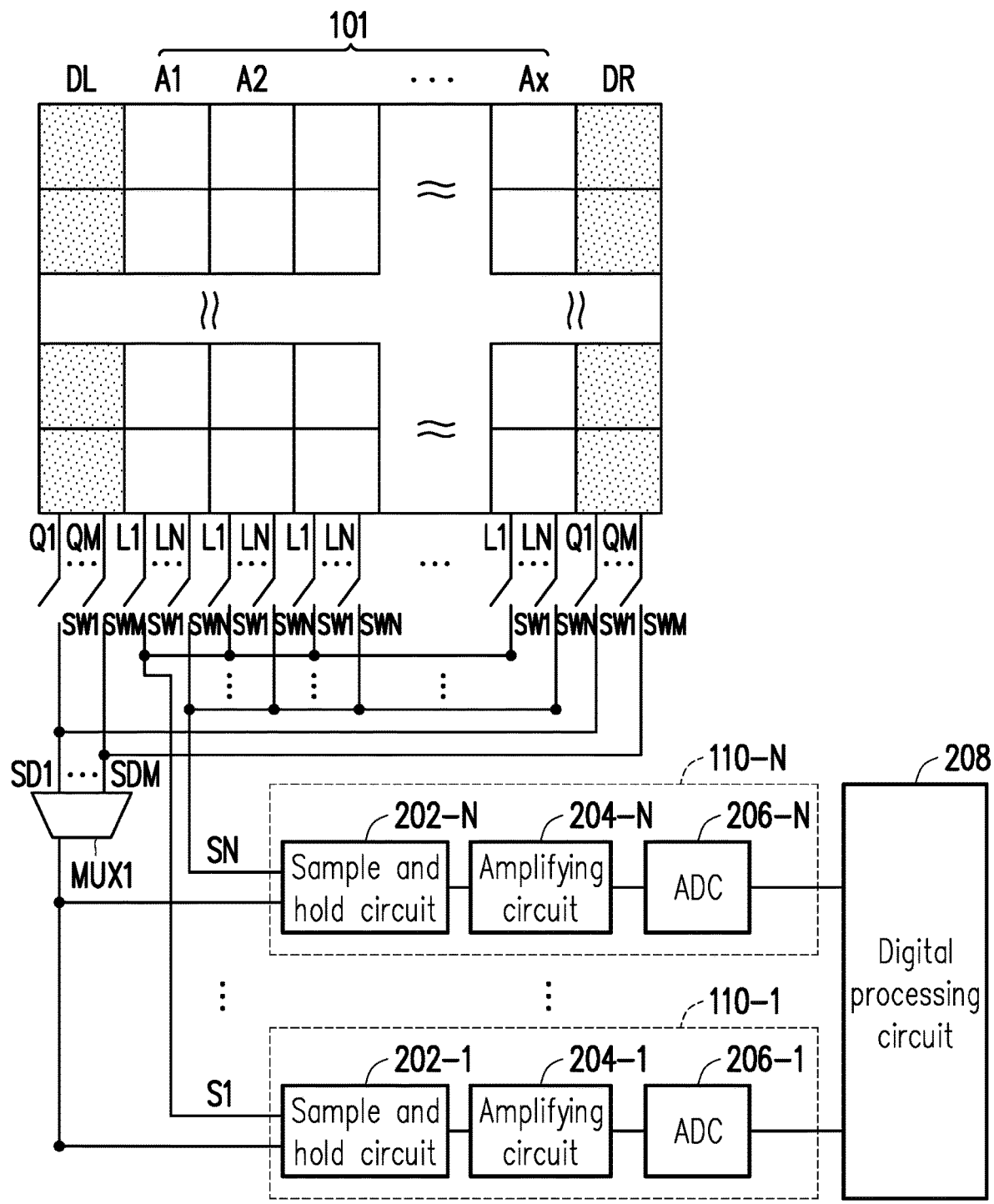
FIG. 7 is a schematic diagram of an optical fingerprint sensing apparatus according to another embodiment of the invention.

FIG. 7 is a schematic diagram of an optical fingerprint sensing apparatus according to another embodiment of the invention. The optical fingerprint sensing apparatus of the present embodiment differs from the optical fingerprint sensing apparatus in the embodiment of FIG. 5 in that, the optical fingerprint sensing apparatus of this embodiment can omit the configuration of the signal conversion circuit 110-0. As shown in FIG. 7, the output terminal of the multiplexer MUX1 is coupled to the sample and hold circuits 202-1 to 202-N. Accordingly, background noise may be cancelled in each of the signal conversion circuits 110-1 to 110-N (e.g., background noise may be cancelled by each of the sample and hold circuits 202-1 to 202-N or background noise may be cancelled by the amplifying circuits 204-1 to 204-N) or in the digital processing circuit 208. That is, background noise is cancelled according to the background noise signal outputted by the multiplexer MUX and input to 110-1 to 110-N. The biggest difference between this implementation of cancelling background noise and the embodiment illustrated in FIG. 2 is that background noise is cancelled by an analog circuit. There are many methods for canceling noise by using the analog circuits, which are not described in detail here.

Figure 8:
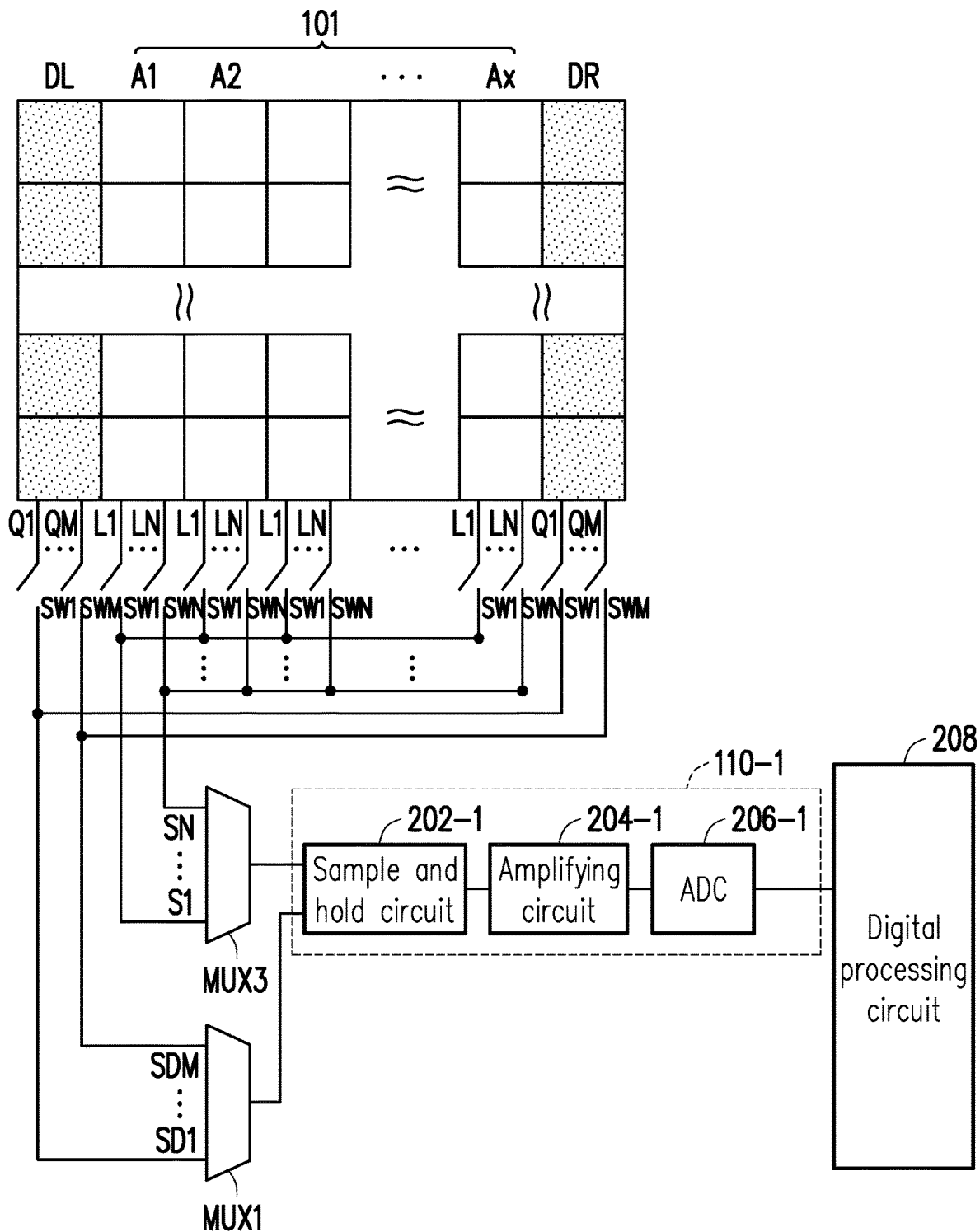
FIG. 8 is a schematic diagram of an optical fingerprint sensing apparatus according to another embodiment of the invention.

FIG. 8 is a schematic diagram of an optical fingerprint sensing apparatus according to another embodiment of the invention. The optical fingerprint sensing apparatus of the present embodiment differs from the optical fingerprint sensing apparatus in the embodiment of FIG. 6 in that, the optical fingerprint sensing apparatus of this embodiment can further omit the configuration of the signal conversion circuit 110-0. As shown in FIG. 8, in this embodiment, the output terminals of the multiplexers MUX1 and MUX3 are coupled to the sample and hold circuits 202-1. Accordingly, background noise may be cancelled in the signal conversion circuit 110-1 (e.g., background noise may be cancelled by the sample and hold circuit 202-1 or background noise may be cancelled by the amplifying circuit 204-1) or in the digital processing circuit 208. That is, background noise of the fingerprint sensing signals outputted by the multiplexer MUX3 is cancelled according to the background noise signal outputted by the multiplexer MUX1. The implementation of the background noise cancellation performed by the signal conversion circuit 110-1 has been described in the embodiment of FIG. 6, or the implementation of the background noise cancellation performed by the digital processing circuit 208 has been described in the embodiment of FIG. 2, which are not repeated herein.

In summary, according to the embodiments of the invention, the control circuit controls the first selection circuit and the second selection circuit to simultaneously output the fingerprint sensing signal and the background noise signal, respectively, so that the signal selection circuit cancels background noise of the fingerprint sensing signals according to the background noise signal. Accordingly, noise of the fingerprint sensing signals can be effectively cancelled to improve fingerprint sensing quality. In addition, the control circuit can perform the background noise cancellation and the fingerprint information interpretation of the fingerprint sensing signal may be performed only on the fingerprint sensing signal and the background noise signal generated by the sensing blocks and the dummy sensing blocks corresponding to an area on which the finger of the user is pressed. As a result, the time required for fingerprint sensing may be effectively reduced to significantly improve fingerprint sensing efficiency.

The invention claimed is:

1. An optical fingerprint sensing apparatus, comprising:
    an optical sensing panel, having a sensing area and a dummy sensing area, the sensing area comprising a plurality of light sensing units configured to receive reflected light from a finger to generate a plurality of fingerprint sensing signals;
    a first selection circuit, coupled to a plurality of sensing signal lines corresponding to the sensing area;

a second selection circuit, coupled to a plurality of dummy sensing signal lines corresponding to the dummy sensing area;

a control circuit, coupled to the optical sensing panel, the first selection circuit and the second selection circuit, controlling the first selection circuit to output at least one of the fingerprint sensing signals of the sensing signal lines, and controlling the second selection circuit to output at least one signal of the dummy sensing signal lines as a background noise signal, so that the first selection circuit and the second selection circuit simultaneously output the fingerprint sensing signal and the background noise signal, respectively; and a signal processing circuit, coupled to the first selection circuit and the second selection circuit, and cancelling background noise of the fingerprint sensing signals according to the background noise signal, wherein the dummy sensing area comprises a first dummy sensing area and a second dummy sensing area, and the first dummy sensing area and the second dummy sensing area are disposed on opposite sides of the sensing area, wherein the sensing area comprises a plurality of sensing columns, the control circuit controls the first selection circuit to output the fingerprint sensing signals corresponding to one of the sensing columns, and the signal processing circuit comprises:

a plurality of first signal conversion circuits, each of the first signal conversion circuits comprising:
a first sample and hold circuit, coupled to the first selection circuit, and sampling and holding the fingerprint sensing signal outputted by the first selection circuit to generate a sensing sample signal;
a first amplifying circuit, coupled to the first sample and hold circuit, and amplifying the sensing sample signal to output a first amplified analog signal; and
a first analog-to-digital conversion circuit, coupled to the first amplifying circuit, and converting the first amplified analog signal into a first digital signal;

a multiplexer, coupled to the second selection circuit and the control circuit, the control circuit controlling the multiplexer to output one of background noise signals provided by the first dummy sensing area or the second dummy sensing area;

a second signal conversion circuit, comprising:
a second sample and hold circuit, coupled to the multiplexer, and sampling and holding the background noise signal outputted by the multiplexer to generate a noise sample signal;
a second amplifying circuit, coupled to the second sample and hold circuit, and amplifying the noise sample signal to output a second amplified analog signal; and
a second analog-to-digital conversion circuit, coupled to the second amplifying circuit, and converting the second amplified analog signal into a second digital signal; and a digital processing circuit, coupled to the first analog-to-digital conversion circuits of the first signal conversion circuits and the second analog-to-digital conversion circuit, cancelling background noise of the first digital signals of the first analog-to-digital conversion circuits according to the second digital signal, and determining fingerprint information of the finger according to the first digital signals in which background noise is cancelled.

2. An optical fingerprint sensing apparatus, comprising:
an optical sensing panel, having a sensing area and a dummy sensing area, the sensing area comprising a plurality of light sensing units configured to receive reflected light from a finger to generate a plurality of fingerprint sensing signals;

a first selection circuit, coupled to a plurality of sensing signal lines corresponding to the sensing area;

a second selection circuit, coupled to a plurality of dummy sensing signal lines corresponding to the dummy sensing area;

a control circuit, coupled to the optical sensing panel, the first selection circuit and the second selection circuit, controlling the first selection circuit to output at least one of the fingerprint sensing signals of the sensing signal lines, and controlling the second selection circuit to output at least one signal of the dummy sensing signal lines as a background noise signal, so that the first selection circuit and the second selection circuit simultaneously output the fingerprint sensing signal and the background noise signal, respectively; and a signal processing circuit, coupled to the first selection circuit and the second selection circuit, and cancelling background noise of the fingerprint sensing signals according to the background noise signal, wherein the dummy sensing area comprises a first dummy sensing area and a second dummy sensing area, and the first dummy sensing area and the second dummy sensing area are disposed on opposite sides of the sensing area, wherein the sensing area comprises a plurality of sensing columns, the control circuit controls the first selection circuit to output the fingerprint sensing signals corresponding to one of the sensing columns, and the signal processing circuit comprises:

a first multiplexer, coupled to the first selection circuit and the control circuit, the control circuit controlling the first multiplexer to output one of the fingerprint sensing signals;

a first signal conversion circuit, comprising:
a first sample and hold circuit, coupled to the first multiplexer, and sampling and holding the fingerprint sensing signal outputted by the first multiplexer to generate a sensing sample signal;
a first amplifying circuit, coupled to the first sample and hold circuit, and amplifying the sensing sample signal to output a first amplified analog signal; and
a first analog-to-digital conversion circuit, coupled to the first amplifying circuit, and converting the first amplified analog signal into a first digital signal;

a second multiplexer, coupled to the second selection circuit and the control circuit, the control circuit controlling the second multiplexer to output one of background noise signals provided by the first dummy sensing area or the second dummy sensing area;

a second signal conversion circuit, comprising:
a second sample and hold circuit, coupled to the second selection circuit, and sampling and holding the background noise signal outputted by the second selection circuit to generate a noise sample signal;
a second amplifying circuit, coupled to the second sample and hold circuit, and amplifying the noise sample signal to output a second amplified analog signal; and
a second analog-to-digital conversion circuit, coupled to the second amplifying circuit, and converting the second amplified analog signal into a second digital signal; and a digital processing circuit, coupled to the first analog-to-digital conversion circuit and the second analog-to-digital conversion circuit, cancelling background noise of the first digital signal according to the second digital signal, and determining fingerprint information of the finger according to the first digital signal in which background noise is cancelled.

3. An optical fingerprint sensing apparatus, comprising:
an optical sensing panel, having a sensing area and a dummy sensing area, the sensing area comprising a plurality of light sensing units configured to receive reflected light from a finger to generate a plurality of fingerprint sensing signals;
a first selection circuit, coupled to a plurality of sensing signal lines corresponding to the sensing area;
a second selection circuit, coupled to a plurality of dummy sensing signal lines corresponding to the dummy sensing area;
a control circuit, coupled to the optical sensing panel, the first selection circuit and the second selection circuit, controlling the first selection circuit to output at least one of the fingerprint sensing signals of the sensing signal lines, and controlling the second selection circuit to output at least one signal of the dummy sensing signal lines as a background noise signal, so that the first selection circuit and the second selection circuit simultaneously output the fingerprint sensing signal and the background noise signal, respectively; and
a signal processing circuit, coupled to the first selection circuit and the second selection circuit, and cancelling background noise of the fingerprint sensing signals according to the background noise signal,
wherein the dummy sensing area comprises a first dummy sensing area and a second dummy sensing area, and the first dummy sensing area and the second dummy sensing area are disposed on opposite sides of the sensing area,
wherein the sensing area comprises a plurality of sensing columns, the control circuit controls the first selection circuit to output the fingerprint sensing signals corresponding to one of the sensing columns, and the signal processing circuit comprises:
a plurality of signal conversion circuits, each of the signal conversion circuits comprising:
  a sample and hold circuit, coupled to the selection circuit, and sampling and holding the fingerprint sensing signal outputted by the selection circuit to generate a sensing sample signal;
  an amplifying circuit, coupled to the sample and hold circuit, and amplifying the sensing sample signal to output an amplified analog signal; and
  an analog-to-digital conversion circuit, coupled to the amplifying circuit, and converting the amplified analog signal into a digital signal;
a multiplexer, coupled to the second selection circuit and the control circuit, the control circuit controlling the multiplexer to output one of background noise signals provided by the first dummy sensing area or the second dummy sensing area to the sample and hold circuits; and
a digital processing circuit, coupled to the analog-to-digital conversion circuits of the signal conversion circuits, cancelling background noise of the digital signals of the analog-to-digital conversion circuits according to the second digital signal, and determining fingerprint information of the finger according to the digital signals in which background noise is cancelled.

4. An optical fingerprint sensing apparatus, comprising:
an optical sensing panel, having a sensing area and a dummy sensing area, the sensing area comprising a plurality of light sensing units configured to receive reflected light from a finger to generate a plurality of fingerprint sensing signals;
a first selection circuit, coupled to a plurality of sensing signal lines corresponding to the sensing area;
a second selection circuit, coupled to a plurality of dummy sensing signal lines corresponding to the dummy sensing area;
a control circuit, coupled to the optical sensing panel, the first selection circuit and the second selection circuit, controlling the first selection circuit to output at least one of the fingerprint sensing signals of the sensing signal lines, and controlling the second selection circuit to output at least one signal of the dummy sensing signal lines as a background noise signal, so that the first selection circuit and the second selection circuit simultaneously output the fingerprint sensing signal and the background noise signal, respectively; and
a signal processing circuit, coupled to the first selection circuit and the second selection circuit, and cancelling background noise of the fingerprint sensing signals according to the background noise signal,
wherein the dummy sensing area comprises a first dummy sensing area and a second dummy sensing area, and the first dummy sensing area and the second dummy sensing area are disposed on opposite sides of the sensing area,
wherein the sensing area comprises a plurality of sensing columns, the control circuit controls the first selection circuit to output the fingerprint sensing signals corresponding to one of the sensing columns, and the signal processing circuit comprises:
a first multiplexer, coupled to the first selection circuit and the control circuit, the control circuit controlling the first multiplexer to output one of the fingerprint sensing signals;
a second multiplexer, coupled to the second selection circuit and the control circuit, the control circuit controlling the second multiplexer to output one of background noise signals provided by the first dummy sensing area or the second dummy sensing area;
a signal conversion circuit, comprising:
  a sample and hold circuit, coupled to the first multiplexer and the second multiplexer, and sampling and holding the fingerprint sensing signal outputted by the first multiplexer and the background noise signal outputted by the second multiplexer to generate a sensing sample signal and a noise sample signal;
  an amplifying circuit, coupled to the sample and hold circuit, and amplifying the sensing sample signal and the noise sample signal to output a first amplified analog signal and a second amplified analog signal, respectively; and
  an analog-to-digital conversion circuit, coupled to the amplifying circuit, and converting the first amplified analog signal and the second amplified analog signal into a first digital signal and a second digital signal, respectively; and
a digital processing circuit, coupled to the analog-to-digital conversion circuit, cancelling background noise of the first digital signal according to the second digital signal, and determining fingerprint information of the finger according to the first digital signal in which background noise is cancelled.

* * * * *